(12) United States Patent
Iijima et al.

(10) Patent No.: US 8,414,694 B2
(45) Date of Patent: Apr. 9, 2013

(54) $CO_2$ RECOVERY APPARATUS AND $CO_2$ RECOVERY METHOD

(75) Inventors: Masaki Iijima, Tokyo (JP); Kouki Ogura, Hyogo (JP); Masahiko Tatsumi, Hyogo (JP); Yasuyuki Yagi, Hyogo (JP)

(73) Assignees: Mitsubishi Heavy Industries, Ltd., Tokyo (JP); The Kansai Electric Power Co., Inc., Osaka-shi, Osaka (JP)

( * ) Notice: Subject to any disclaimer, the term of this patent is extended or adjusted under 35 U.S.C. 154(b) by 208 days.

(21) Appl. No.: 12/645,591

(22) Filed: Dec. 23, 2009

(65) Prior Publication Data
US 2010/0319532 A1    Dec. 23, 2010

(30) Foreign Application Priority Data
Jun. 17, 2009   (JP) .................................. 2009-144585

(51) Int. Cl.
*B01D 53/14*   (2006.01)

(52) U.S. Cl.
USPC ................... 96/251; 96/244; 96/242; 95/179; 95/183; 95/193; 95/209; 95/227; 95/16; 95/236

(58) Field of Classification Search .......................... None
See application file for complete search history.

(56) References Cited

U.S. PATENT DOCUMENTS

| | | | | |
|---|---|---|---|---|
| 3,563,696 A | * | 2/1971 | Benson et al. | 423/223 |
| 3,897,226 A | * | 7/1975 | Doherty | 95/12 |
| 4,106,916 A | * | 8/1978 | Tuckett et al. | 95/21 |
| 4,146,569 A | | 3/1979 | Giammarco et al. | |
| 4,152,217 A | * | 5/1979 | Eisenberg et al. | 203/2 |
| 4,460,383 A | * | 7/1984 | Valerius | 203/1 |
| 5,192,341 A | * | 3/1993 | Ehrler | 95/189 |

(Continued)

FOREIGN PATENT DOCUMENTS

| | | |
|---|---|---|
| CA | 2718386 A1 | 9/2009 |
| JP | 33-459 A | 1/1958 |

(Continued)

OTHER PUBLICATIONS

Canadian Office Action dated May 31, 2011, issued in corresponding Canadian Patent Application No. 2,688,966.

(Continued)

*Primary Examiner* — Duane Smith
*Assistant Examiner* — Pankti Patel
(74) *Attorney, Agent, or Firm* — Westerman, Hattori, Daniels & Adrian, LLP

(57) ABSTRACT

Provided are a $CO_2$ absorber that reduces $CO_2$ contained in flue gas; a regenerator that reduces $CO_2$ contained in rich solvent absorbing $CO_2$ to regenerate the rich solvent, so that lean solvent having the $CO_2$ reduced in the regenerator is reused in the $CO_2$ absorber; a heat exchanger that allows the rich solvent to exchange heat with the lean solvent; and a controller that controls to extract rich solvent portion that is part of the rich solvent, to allow the rich solvent portion to by pass the heat exchanger, and to be supplied into the top of the regenerator without exchanging heat so as to minimize a sum of an enthalpy that is taken out of the regenerator as $CO_2$ gas accompanying steam and an enthalpy of the lean solvent after heat exchange with the rich solvent in the heat exchanger.

4 Claims, 7 Drawing Sheets

U.S. PATENT DOCUMENTS

| | | | |
|---|---|---|---|
| 5,298,156 A * | 3/1994 | Blanc et al. | 208/341 |
| 6,090,356 A * | 7/2000 | Jahnke et al. | 423/210 |
| 6,800,120 B1 * | 10/2004 | Won et al. | 96/234 |
| 2005/0132883 A1 * | 6/2005 | Su et al. | 95/235 |
| 2006/0032377 A1 * | 2/2006 | Reddy et al. | 96/234 |
| 2007/0053817 A1 * | 3/2007 | Iijima et al. | 423/220 |
| 2008/0184887 A1 * | 8/2008 | Mak | 95/174 |
| 2009/0151564 A1 * | 6/2009 | Handagama et al. | 95/179 |
| 2010/0003177 A1 * | 1/2010 | Aroonwilas et al. | 423/229 |
| 2010/0132563 A1 * | 6/2010 | Pan et al. | 96/181 |
| 2011/0020203 A1 * | 1/2011 | Eksilioglu et al. | 423/220 |
| 2011/0052453 A1 * | 3/2011 | McLarnon et al. | 422/170 |

FOREIGN PATENT DOCUMENTS

| | | |
|---|---|---|
| JP | 53-33981 A | 3/1978 |
| JP | 55-9079 A | 1/1980 |
| JP | 3-193116 A | 8/1991 |
| JP | 2007-61777 A | 3/2007 |
| JP | 2009-214089 A | 9/2009 |
| WO | 2006/118795 A1 | 11/2006 |
| WO | 2008/144918 A1 | 12/2008 |
| WO | 2009/112518 A1 | 9/2009 |

OTHER PUBLICATIONS

European Search Report dated Aug. 17, 2010, issued in corresponding European Patent Application No. 10150434.8.

Notice of Allowance dated Jul. 16, 2012, issued in corresponding Canadian Patent Application No. 2,688,966 (1 page).

Japanese Office Action dated Sep. 25, 2012, issued in corresponding Japanese Patent Application No. 2009-144585, w/ English translation.

* cited by examiner

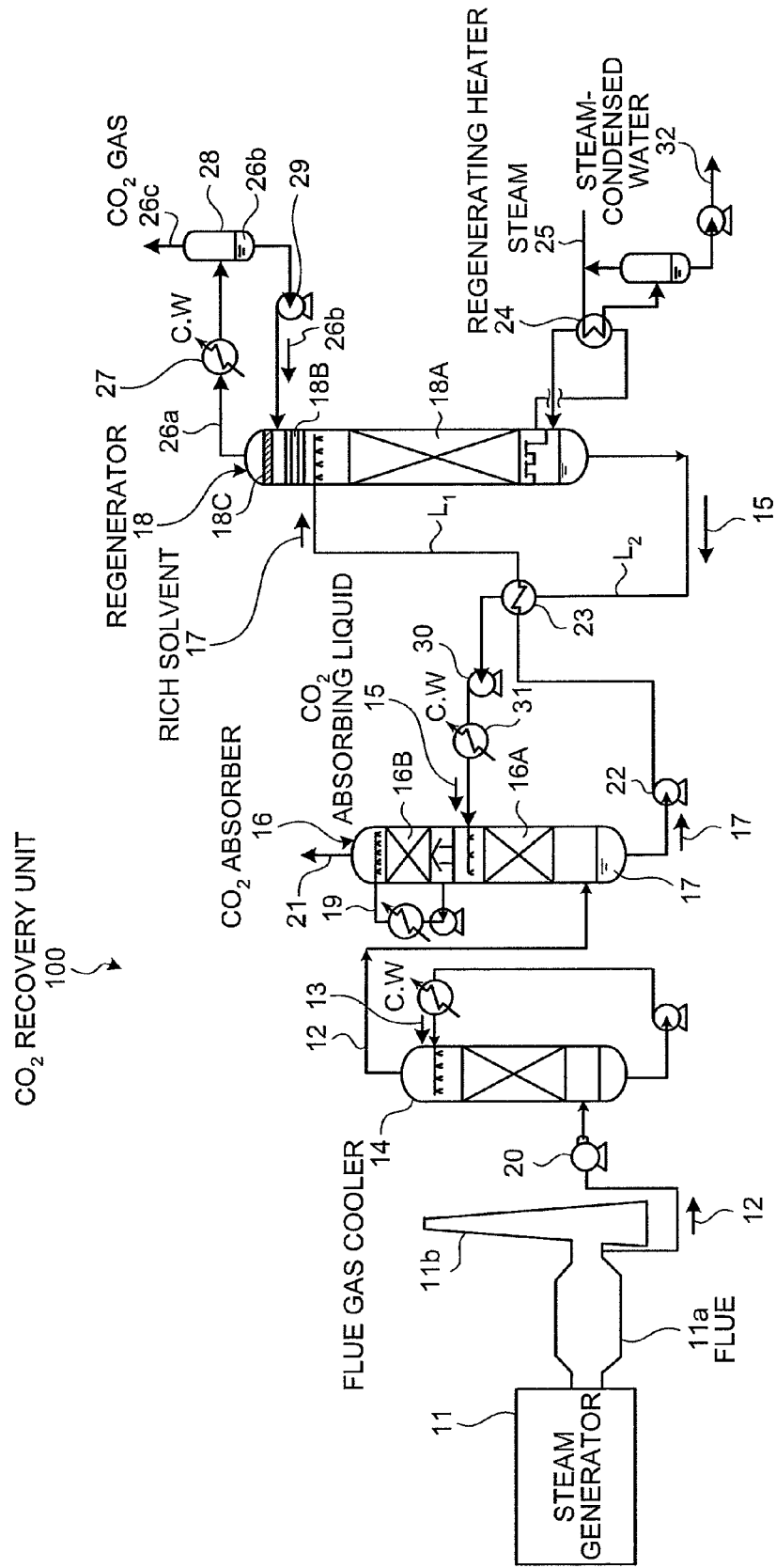

CO$_2$ RECOVERY APPARATUS AND CO$_2$ RECOVERY METHOD

TECHNICAL FIELD

The present invention relates to a CO$_2$ recovery unit and a CO$_2$ recovery method that can dramatically reduce the amount of energy used in regenerating a CO$_2$ absorbent in a CO$_2$ recovery process.

BACKGROUND ART

It has come to be pointed out that one of the causes of the global warming is a greenhouse effect of CO2, and it has became an urgent task, also internationally, to provide a countermeasure for CO2 to protect the global environment against the warming. CO2 is generated by any human activities combusting fossil fuels, and there are increasing demands for suppressing CO2 emissions. Along with such an increasing demand, researchers are energetically investigating a method for reducing and recovering CO2 included in flue gas, to apply in a power plant that consumes a large amount of fossil fuels, such as a thermal plant. In such a method, flue gas emitted from a steam generator is brought into contact with an amine-based CO2 absorbent to allow such absorbent to absorb the CO2, and the recovered CO2 is stored therein without being released into the air. As processes for reducing and recovering CO2 from the flue gas using the CO2 absorbent, Japanese Patent Application Laid-open No. H3-193116, for example, brings flue gas into contact with the CO$_2$ absorbent in an absorber, heats an absorbent that has absorbed CO$_2$ in a regenerator, isolates CO$_2$ as well as regenerates the absorbent, and circulates the absorbent back to the absorber and reuses the absorbent therein.

As shown in FIG. 5, a conventional CO$_2$ recovering apparatus 100 as mentioned above includes a flue gas cooler 14, a CO$_2$ absorber 16, and a regenerator 18. The flue gas cooler 14 cools flue gas 12 containing CO$_2$ emitted from an industrial combustion facility 11, such as a steam generator or a gas turbine, with cooling water 13. The CO$_2$ absorber 16 further includes a CO$_2$ recovering unit 16A. The CO$_2$ recovering unit 16A brings the flue gas 12, containing the cooled CO$_2$, into contact with CO$_2$ absorbent (hereinafter, also referred to as "absorbent") 15 that absorbs CO$_2$, to reduce CO$_2$ in the flue gas 12. The regenerator 18 causes CO$_2$ absorbent (hereinafter, also referred to as "rich solvent") 17 that has absorbed CO$_2$ to release CO$_2$ to regenerate the CO$_2$ absorbent.

In the CO$_2$ recovering apparatus 100, the regenerated CO$_2$ absorbent (hereinafter, also referred to as "lean solvent") 15 having CO$_2$ reduced in the regenerator 18 is reused in the CO$_2$ absorber 16 as the CO$_2$ absorbent.

By a CO$_2$ recovering method using the CO$_2$ recovering apparatus 100, a flue gas booster fan 20 raises the pressure of the flue gas 12 emitted from an industrial combustion facility such as a steam generator or a gas turbine and containing CO$_2$. The flue gas 12 is then sent into the flue gas cooler 14, cooled by way of the cooling water 13, and then sent into the CO$_2$ absorber 16.

The CO$_2$ absorber 16 then brings the flue gas 12 in a counter-current contact with the CO$_2$ absorbent 15 that is based on amine-based solvent, allowing the CO$_2$ absorbent 15 to absorb the CO$_2$ contained in the flue gas 12 by way of chemical reaction.

A washing unit 16B, included in the CO$_2$ absorber 16, brings the flue gas having CO$_2$ reduced in the CO$_2$ recovering unit 16A into a gas-liquid contact with circulating condensate water 19. The condensate water 19 contains the CO$_2$ absorbent, and is supplied via a nozzle included in a washing unit 16B. In this manner, the CO$_2$ absorbent 15 that has accompanied the flue gas having CO$_2$ reduced is recovered. Flue gas 12 having CO$_2$ reduced is released out of the system.

A rich solvent pump 22 increases the pressure of the rich solvent that is the CO$_2$ absorbent 17 that has absorbed CO$_2$. Then, a rich/lean solvent heat exchanger 23 heats the rich solvent by way of the CO$_2$ absorbent 15 that is lean solvent regenerated by the regenerator 18, and supplied into the regenerator 18.

The rich solvent discharged into the regenerator 18 through the top thereof causes an endothermal reaction, thus releasing a majority of CO$_2$. The CO$_2$ absorbent that has released some or a majority of CO$_2$ in the regenerator 18 is called semi-lean solvent. By the time the semi-lean solvent reaches the bottom of the regenerator 18, almost all of the CO$_2$ is removed, turning the semi-lean solvent into the absorbent 15. A regenerating heater 24 then heats the lean solvent by way of steam 25, supplying steam inside the regenerator 18.

CO$_2$ gas 26a is guided out from the top of the regenerator 18, together with the steam that has been released from the rich solvent and semi-lean solvent in the regenerator 18. A condenser 27 then condenses steam contained in the CO$_2$ gas 26, and a separation drum 28 separates water 26b from the CO$_2$ gas 26. The CO$_2$ gas 26c is then released out of the system, and recovered separately. The recovered CO$_2$ gas 26c is injected into an oilfield using enhanced oil recovery (EOR) method, or stored in an aquifer as a countermeasure for global warming.

The water 26b separated in the separation drum 28 is pumped up to the top of the regenerator 18 by way of a condensed-water circulating pump 29. The rich/lean solvent heat exchanger 23 cools the regenerated CO$_2$ absorbent (lean solvent) 15 by way of the rich solvent 17. A lean solvent pump 30 then increases the pressure of the lean solvent 15. After being cooled down by a lean solvent cooler 31, the lean solvent 15 is supplied into the CO$_2$ absorber 16.

In FIG. 5, the reference numeral 11a denotes to a flue for the flue gas 12; the reference numeral 11b denotes to a stack; and the reference numeral 32 denotes to steam-condensed water. The CO$_2$ recovering apparatus may be either added to an existing flue gas source to recover CO$_2$, or installed with a flue gas source that is to be newly installed. A door that can be opened and closed is attached on the stack 11b. The door is closed while the CO$_2$ recovering apparatus is operating, and opened while the flue gas source is operating but the CO$_2$ recovering apparatus is not operating.

As a method for releasing CO$_2$ gas from the rich solvent 17 that has absorbed CO$_2$ to regenerate the absorbent, steam stripping is used. According to this method, the absorbent is boiled in the regenerating heater 24 to generate steam. The absorbent is heated thereby in the regenerator 18, and is regenerated by way of a steam-stripping effect thereof.

Disadvantageously, this method has a high heat loss, because steam is released out of the steam system by accompanying the CO$_2$ gas 26a that is brought out of the regenerator 18.

In response to this issue, according to a suggestion disclosed in Japanese Patent Application Laid-open No. 55-9079, for example, in a process for regenerating a spent aqueous amine absorbent liquid containing acid gas impurities such as hydrogen sulfide and carbon dioxide by stripping the acid gas impurities from the spent amine absorption liquid in a regeneration tower, an improvement includes: splitting spent absorbent liquid stream such that at least a portion of the spent absorbent stream passes directly to the top of the regeneration tower; continuously measuring the temperature difference between the liquid entering and the vapor exiting overhead at the top of the regeneration tower; and also continuously measuring the difference in temperature between the combined mixture of the vapor rising from the bottom of the regeneration tower plus the vapor entering at the intermediate point and the liquid entering at the intermediate point, such that the temperature differentials at both the top and intermediate points of the regeneration tower are maintained at temperatures ranging from 1 degree to 15 degrees Fahrenheit (F) to reduce steam requirements.

CITATION LIST

Patent Literature

[PATENT LITERATURE 1] Japanese Patent Application Laid-open No. H3-193116
[PATENT LITERATURE 2] Japanese Patent Application Laid-open No. S55-9079

SUMMARY OF INVENTION

Technical Problem

However, according to the amine regenerating method disclosed in the Japanese Patent Application Laid-open No. S55-9079, the enthalpy of the entire system is not taken into account. Therefore, it is desirable to reduce steam requirement considering a heat balance of the entire system.

The present invention is made in consideration of the above, and an object of the present invention is to provide a $CO_2$ recovery unit and a $CO_2$ recovery method that can dramatically reduce the amount of energy used in regenerating an absorbent by considering an enthalpy of the system of $CO_2$ absorbing apparatus.

Solution to Problem

According to an aspect of the present invention, a $CO_2$ recovery unit, which includes a $CO_2$ absorber that brings flue gas containing $CO_2$ into contact with a $CO_2$ absorbent to reduce the $CO_2$ contained in the flue gas, and a regenerator that reduces $CO_2$ contained in rich solvent absorbing $CO_2$ in the $CO_2$ absorber to regenerate the rich solvent, so that lean solvent from which the $CO_2$ is reduced in the regenerator is reused in the $CO_2$ absorber, includes: a heat exchanger that allows the rich solvent to exchange heat with the lean solvent; and a controller that controls to extract part of the rich solvent to allow the part to bypass the heat exchanger, and to be supplied into a top of the regenerator without exchanging heat so as to minimize a sum of an enthalpy that is taken out of the regenerator as $CO_2$ gas accompanying steam and an enthalpy that is a result of subtracting an enthalpy of the rich solvent before heat exchange in the heat exchanger from an enthalpy of the lean solvent after the heat exchange.

Advantageously, in the $CO_2$ recovery unit, control is performed to approximate a temperature difference between the rich solvent and the lean solvent at an entering side of the heat exchanger and a temperature difference between the rich solvent and the lean solvent at an exiting side of the heat exchanger.

Advantageously, in the $CO_2$ recovery unit, the part of the rich solvent that has bypassed the heat exchanger accounts for 3 to 15 percent by weight of the rich solvent.

Advantageously, the $CO_2$ recovery unit further includes a first heat exchanging unit that allows the part of the rich solvent that has bypassed the heat exchanger and been guided into the top of the regenerator to exchange heat in an upper section of the regenerator.

Advantageously, the $CO_2$ recovery unit further includes a second heat exchanging unit that allows the part of the rich solvent that has bypassed the heat exchanger to exchange heat with the $CO_2$ gas accompanying steam extracted from the regenerator.

According to another aspect of the present invention, a $CO_2$ recovery method, for a $CO_2$ absorber that brings flue gas containing $CO_2$ into contact with a $CO_2$ absorbent to reduce the $CO_2$ contained in the flue gas, and a regenerator that reduces $CO_2$ contained in rich solvent absorbing $CO_2$ in the $CO_2$ absorber to regenerate the rich solvent, so that lean solvent from which the $CO_2$ is reduced in the regenerator is reused in the $CO_2$ absorber, includes: allowing the rich solvent to exchange heat with the lean solvent; and controlling to extract part of the rich solvent to allow the part to bypass the heat exchanger, and to be supplied into a top of the regenerator without exchanging heat so as to minimize a sum of an enthalpy that is taken out of the regenerator as $CO_2$ gas accompanying steam and an enthalpy that is a result of subtracting an enthalpy of the rich solvent before heat exchange in the heat exchanger from an enthalpy of the lean solvent after the heat exchange.

Advantageously, the $CO_2$ recovery method further includes allowing the part of the rich solvent that has bypassed the heat exchanger and been guided into the top of the regenerator to exchange heat in an upper section of the regenerator.

Advantageously, the $CO_2$ recovery method further includes allowing the part of the rich solvent that has bypassed the heat exchanger to exchange heat with the $CO_2$ gas accompanying steam extracted from the regenerator.

Advantageous Effects of Invention

According to the present invention, the heat balance of the entire system can be taken into account. As a result, the amount of steam supplied into the reheater can be dramatically reduced.

BRIEF DESCRIPTION OF DRAWINGS

FIG. 5 is an exemplary structure of a conventional $CO_2$ recovery unit.

DESCRIPTION OF EMBODIMENTS

Embodiments of a $CO_2$ recovery unit according to the present invention will now be explained in detail with reference to the drawings. The embodiments disclosed herein are not intended to limit the scope of the present invention in any way.

Example 1

A $CO_2$ recovery unit according to a first embodiment of the present invention will now be explained with reference to FIG. 1.

Figure 1:
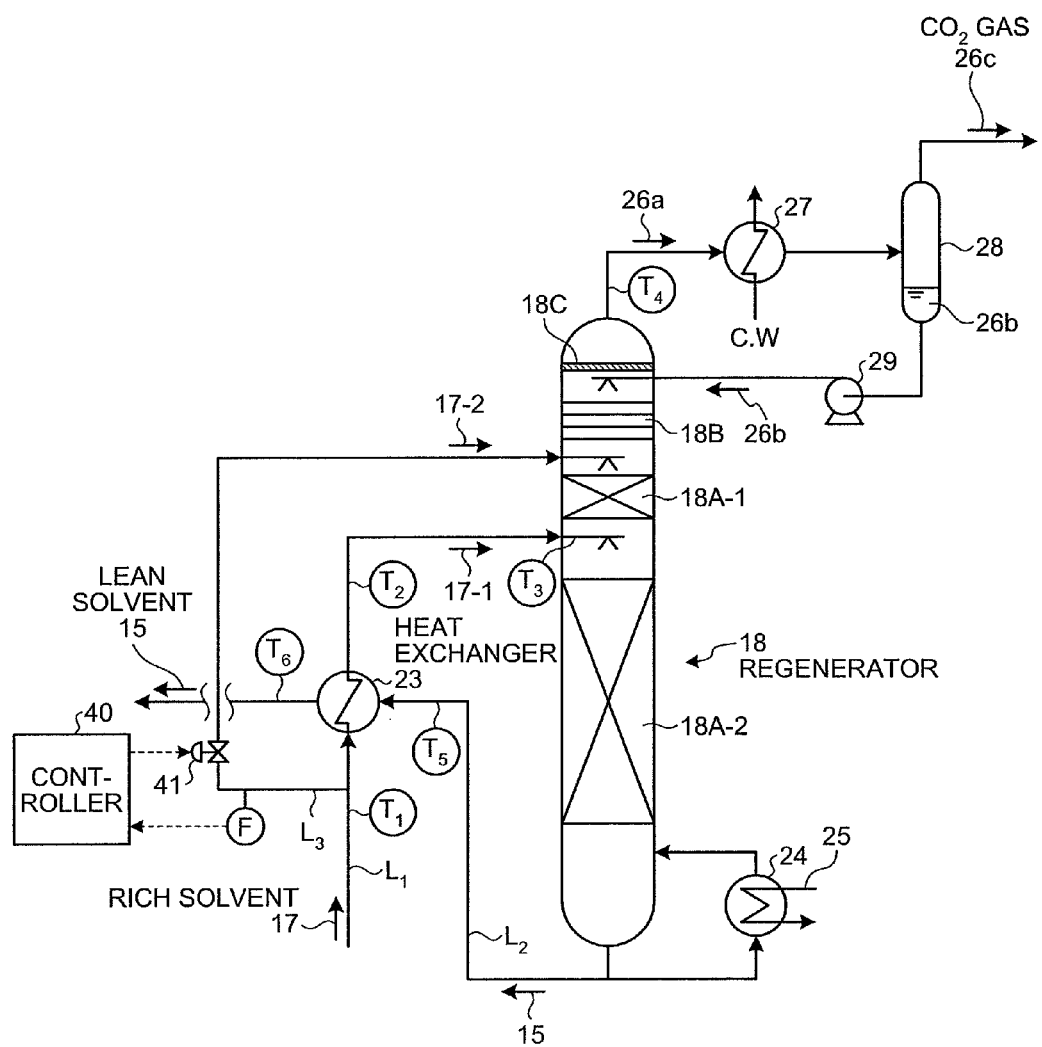
FIG. 1 is a schematic of a structure of a $CO_2$ recovery unit according to a first embodiment of the present invention.
Figure 2A:
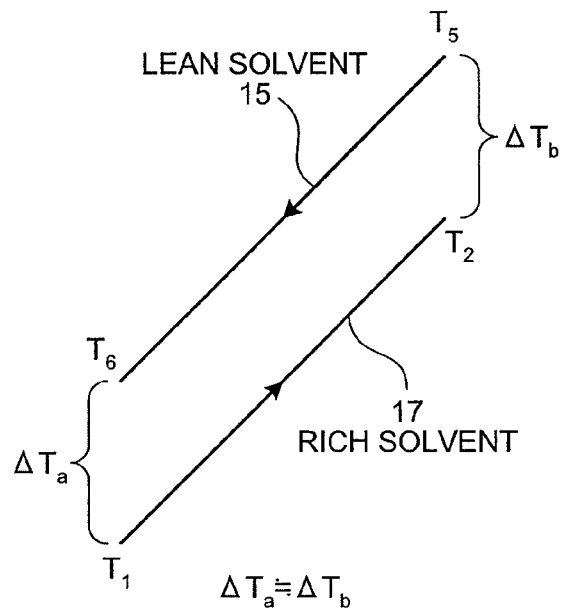
FIG. 2A is a schematic of a heat balance of a lean solvent and a rich solvent in a heat exchanger included in the $CO_2$ recovery unit shown in FIG. 1.
Figure 2B:
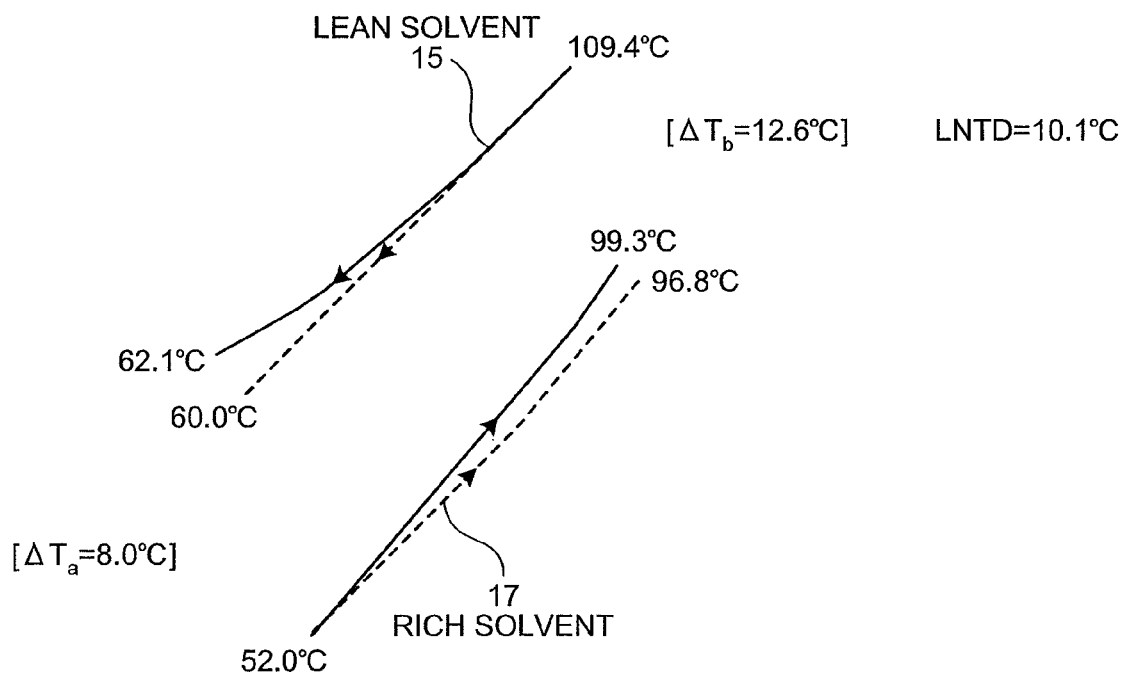
FIG. 2B is a schematic of a test example of the heat balance of the lean solvent and the rich solvent in the heat exchanger of the $CO_2$ recovery unit shown in FIG. 1.

FIG. 1 is a schematic of a structure of the $CO_2$ recovery unit according to the first embodiment. FIG. 2A is a schematic of a heat balance of a lean solvent and a rich solvent in a heat exchanger included in the $CO_2$ recovery unit according to the first embodiment. FIG. 2B is a schematic of a test example of the heat balance of the lean solvent and the rich solvent in the heat exchanger of the $CO_2$ recovery unit according to the first embodiment. In FIG. 1, the same structures as those in the $CO_2$ recovery unit shown in FIG. 5 are given the same reference signs, and redundant explanations thereof are omitted herein. FIG. 1 depicts the $CO_2$ regenerator 18 included in the $CO_2$ recovery unit 100 explained above.

As shown in FIG. 1, the $CO_2$ recovery unit according to the first embodiment includes: a $CO_2$ absorber (not shown) that brings flue gas containing $CO_2$ into contact with $CO_2$ absorbent to reduce the $CO_2$ contained in the flue gas; a regenerator 18 that reduces $CO_2$ contained in rich solvent 17 that has absorbed $CO_2$ in the $CO_2$ absorber to regenerate the rich solvent 17, so that lean solvent 15 having $CO_2$ reduced in the regenerator 18 is reused in the $CO_2$ absorber; a rich/lean solvent heat exchanger (hereinafter, "heat exchanger") 23 that allows the rich solvent 17 to exchange heat with the lean solvent 15; and a controller 40 that controls to extract rich solvent portion 17-2 that is part of the rich solvent 17, to allow the rich solvent portion 17-2 to bypass the heat exchanger 23, and to be supplied into the top of the regenerator 18 without exchanging heat, so as to minimize the sum (E1+E2) of an enthalpy (E1) that is taken out of the regenerator 18 as the $CO_2$ gas 26a accompanying steam, and an enthalpy (E2) that is the result of subtracting an enthalpy of the rich solvent 17 before exchanging heat in the heat exchanger 23 from an enthalpy of the lean solvent 15 after exchanging heat.

In FIG. 1, the references sign 18A-1 denotes to a first regenerating unit; the references sign 18A-2 denotes to a second regenerating unit; the references sign 18B denotes to a washing unit; the references sign 18C denotes to a demister; the references sign $L_1$ denotes to a rich solvent supplying line; the references sign $L_2$ denotes to a lean solvent supplying line; the references sign $L_3$ denotes to a split rich solvent supplying line; the references sign 41 denotes to an adjusting valve inserted into the split rich solvent supplying line $L_3$; and the references sign F denotes to a flow meter.

According to the first embodiment, the rich solvent portion 17-2 that is part of the rich solvent 17 is split into the split rich solvent supplying line $L_3$, supplied into the regenerator 18, stripped in the first regenerating unit 18A-1 included in the regenerator 18 by way of steam rising from the bottom of the regenerator 18 to release $CO_2$ gas. The released $CO_2$ gas is taken out from the top of the regenerator 18 as the $CO_2$ gas 26a accompanying steam.

Because the extracted rich solvent portion 17-2 does not exchange heat in the heat exchanger 23, the temperature of the rich solvent remains low, maintaining a great heat exchange capacity. This heat exchange capacity allows the rich solvent portion 17-2 to exchange heat with steam in the first regenerating unit 18A-1.

As a result, a less amount of the enthalpy (E1) is taken out of the regenerator 18 as the $CO_2$ gas 26a accompanying steam, in comparison with a scenario without splitting the rich solvent 17.

A major rich solvent portion 17-1 having exchanged heat in the heat exchanger 23 is supplied into an intermittent area of the regenerator 18, and stripped in the second regenerating unit 18A-2 in the regenerator 18 by way of steam rising from the bottom of the regenerator 18 to release $CO_2$ gas.

According to the present invention, the enthalpy (E2) of the lean solvent 15 after exchanging heat in the heat exchanger 23 is obtained. The enthalpy (E1) that is taken out as the $CO_2$ gas 26a accompanying steam is also obtained. Then, an adjusting valve 41 is adjusted to adjust the amount of the rich solvent 17 to be split under an instruction of the controller 40, so as to minimize the sum of the enthalpy (E2) and the enthalpy (E1).

The enthalpy (E1) that is taken out as the $CO_2$ gas 26a accompanying steam can be obtained based on a temperature ($T_4$) and the pressure of the $CO_2$ gas 26a that is taken out accompanying steam, and the amount of the recovered $CO_2$.

The enthalpy (E2) of the lean solvent after exchanging heat can be obtained based on a difference between a temperature ($T_6$) of the lean solvent 15 after exchanging heat in the heat exchanger 23 and the temperature ($T_1$) of the rich solvent 17 before exchanging heat in the heat exchanger 23, and the flow rate and the pressure of the lean solvent.

A ratio of the rich solvent portion 17-2 to be bypassed differs depending on a plant facility; however, it is preferable to set the ratio approximately between 3 to 15 percent by weight.

This is because, if the ratio is not within this range, the sum of the enthalpies (E1+E2) will not be minimized.

Furthermore, as shown in FIG. 2A, the controller 40 preferably controls to approximate a temperature difference at an entering side of the heat exchanger 23 [(the temperature of the lean solvent 15 ($T_6$)—the temperature of rich the solvent 17 ($T_1$): $\Delta T_a$] and a temperature difference at an exiting side of the heat exchanger 23 [(the temperature of the lean solvent 15 ($T_5$)—the temperature of the rich solvent 17 ($T_2$)): $\Delta T_b$] ($\Delta T_a \approx \Delta T_b$).

At this time, because the rich solvent absorbs $CO_2$ gas in the $CO_2$ absorber, the rich solvent becomes greater in volume approximately by 10 percent. Therefore, to make the heat exchange performed in the heat exchanger 23 suitable, the temperature differences should be brought to the same level. In this manner, the efficiency of the heat exchange can be made ideal.

More specifically, when part of the rich solvent 17 was not split, as shown in FIG. 2B, the temperature difference at the entering side of the heat exchanger 23 was [(the temperature of the lean solvent 15 ($T_6$: 60.0 degrees Celsius)—the temperature of the rich solvent 17 ($T_1$: 52.0 degrees Celsius)) $\Delta T_a$: 8.0 degrees Celsius], and the temperature difference at the exiting side of the heat exchanger 23 was [(the temperature of the lean solvent 15 ($T_5$: 109.4 degrees Celsius)—the temperature of the rich solvent 17 ($T_2$: 96.8 degrees Celsius)) $\Delta T_b$: 12.6 degrees Celsius], respectively, and these temperature differences were not approximate.

In contrast, when part of the rich solvent 17 was split as disclosed herein, the temperature difference at the entering side of the heat exchanger 23 was [(the temperature of the lean solvent 15 ($T_6$: 62.1 degrees Celsius)—the temperature of the rich solvent 17 ($T_1$: 52.0 degrees Celsius)) $\Delta T_a$: 10.1 degrees Celsius], and the temperature difference at the exiting side of the heat exchanger 23 was [(the temperature of the lean solvent 15 ($T_5$: 109.4 degrees Celsius)—the temperature of the rich solvent 17 ($T_2$: 99.3 degrees Celsius)) $\Delta T_b$: 10.1 degrees Celsius], and the temperature differences were the same.

In this manner, the heat exchange efficiency of the heat exchanger 23 can be maximized.

A particular example of an operation performed by the $CO_2$ recovery unit will now be explained.
(1) The $CO_2$ recovery unit is driven to recover $CO_2$ from the flue gas.
(2) When the circulation of the absorbent reaches a predetermined stability, a controller unit, not shown, controls to gradually open the adjusting valve 41 so that part of the rich solvent 17 is split to the split rich solvent supplying line $L_3$.
(3) The enthalpy (E1) taken out as the $CO_2$ gas 26a accompanying steam is then obtained. The enthalpy (E2) of the lean solvent 15 after heat exchange is also obtained. A controller, not shown, controls to adjust the adjusting valve 41 so as to minimize the sum of the enthalpy (E1) and the enthalpy (E2).
(4) While the operation is kept running, the controller 40 constantly monitors to keep the sum of the enthalpies to the minimum.

By controlling according to the present invention, the heat balance of the entire system is taken into account. As a result, the amount of steam supplied into a regenerating heater 24 can be dramatically reduced.

Test Example

A test was performed using an amine-based solution as the $CO_2$ absorbent to recover 29.0 Nm/H (57.0 Kg/H) of carbon dioxide. In this test setting, according to the conventional method where no part of the rich solvent 17 that is to be supplied into the regenerator 18 was split, the temperature of the $CO_2$ gas 26a that is taken out from the top of the regenerator 18 accompanying steam was 87 degrees Celsius.

On the contrary, as shown in FIG. 1, when the portion 17-2 of the rich solvent 17 was split to minimize the sum (E1+E2) of the enthalpy (E1) taken out of the regenerator 18 as the $CO_2$ gas 26a accompanying steam, and the enthalpy (E2) of the lean solvent 15 after exchanging heat with the rich solvent 17 in the heat exchanger 23 (33.1 kg/H that was approximately 5 percent of 681.1 kg/H of the rich solvent 17 was split), the temperature of the $CO_2$ gas 26a accompanying steam declined to 60 degrees Celsius.

At this time, the heat lost in the lean solvent 15 was 1,310 Kcal/H, and the heat gained at the top of the regenerator 18 was 4,830 Kcal/H. The amount of steam corresponding to the energy of 3,520 Kcal/H that is the difference between these two was reduced.

Therefore, approximately 7.5 percent of 46,800 Kcal/H that is the amount of steam used in the regenerating heater 24 was reduced to improve the heat efficiency of the entire system.

In other words, according to the present invention, the heat of steam to be taken out from the top of the regenerator can be recovered to increase the temperature of the rich solvent, as well as to regenerate the rich solvent. In this manner, less amount of energy is required to supply steam in the regenerating heater 24 that generates steam for regeneration of the absorbent.

Example 2

A $CO_2$ recovery unit according to a second embodiment of the present invention will now be explained with reference to FIGS. 3A and 3B.

Figure 3A:
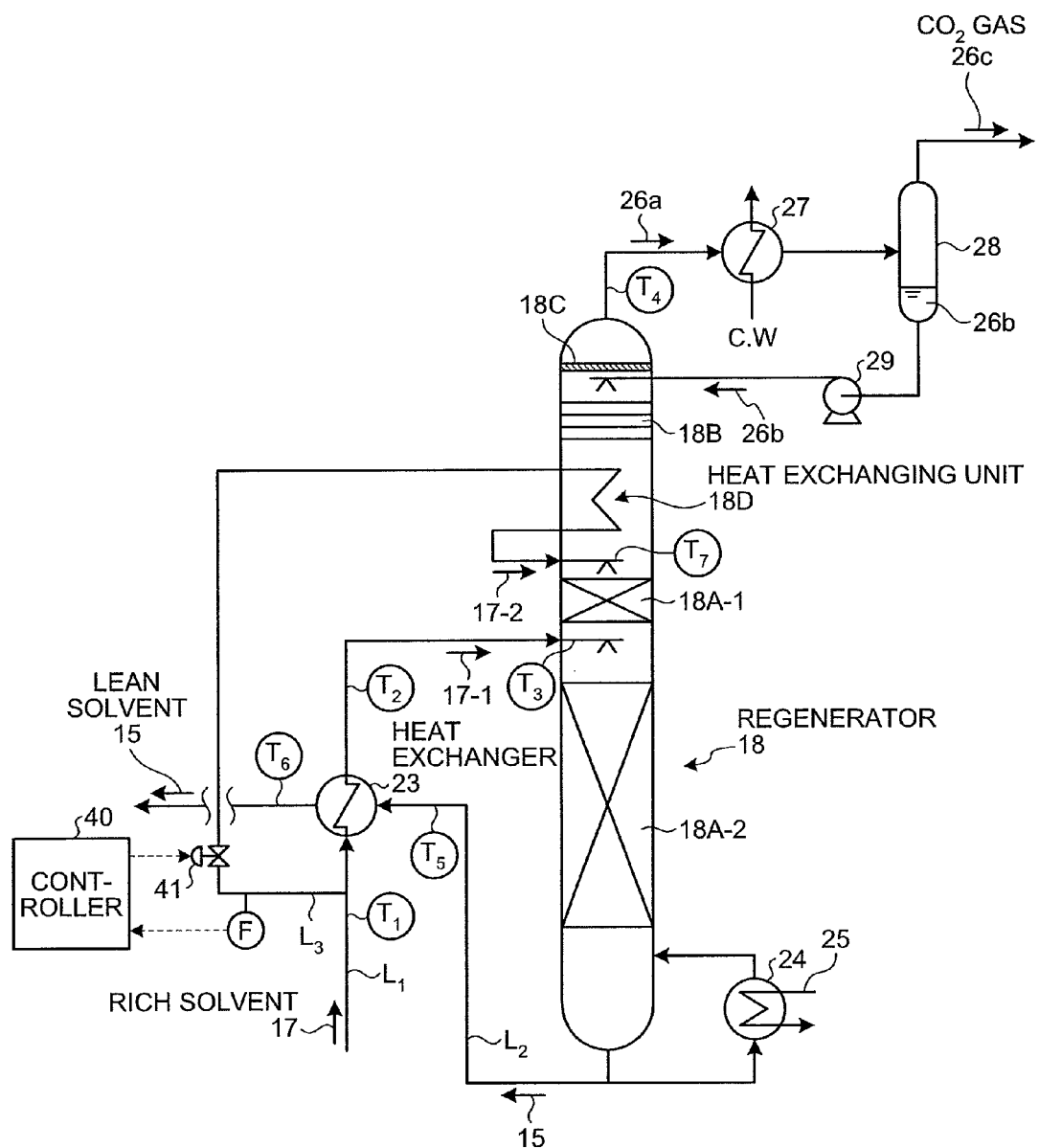
FIG. 3A is a schematic of a structure of a $CO_2$ recovery unit according to a second embodiment of the present invention.
Figure 3B:
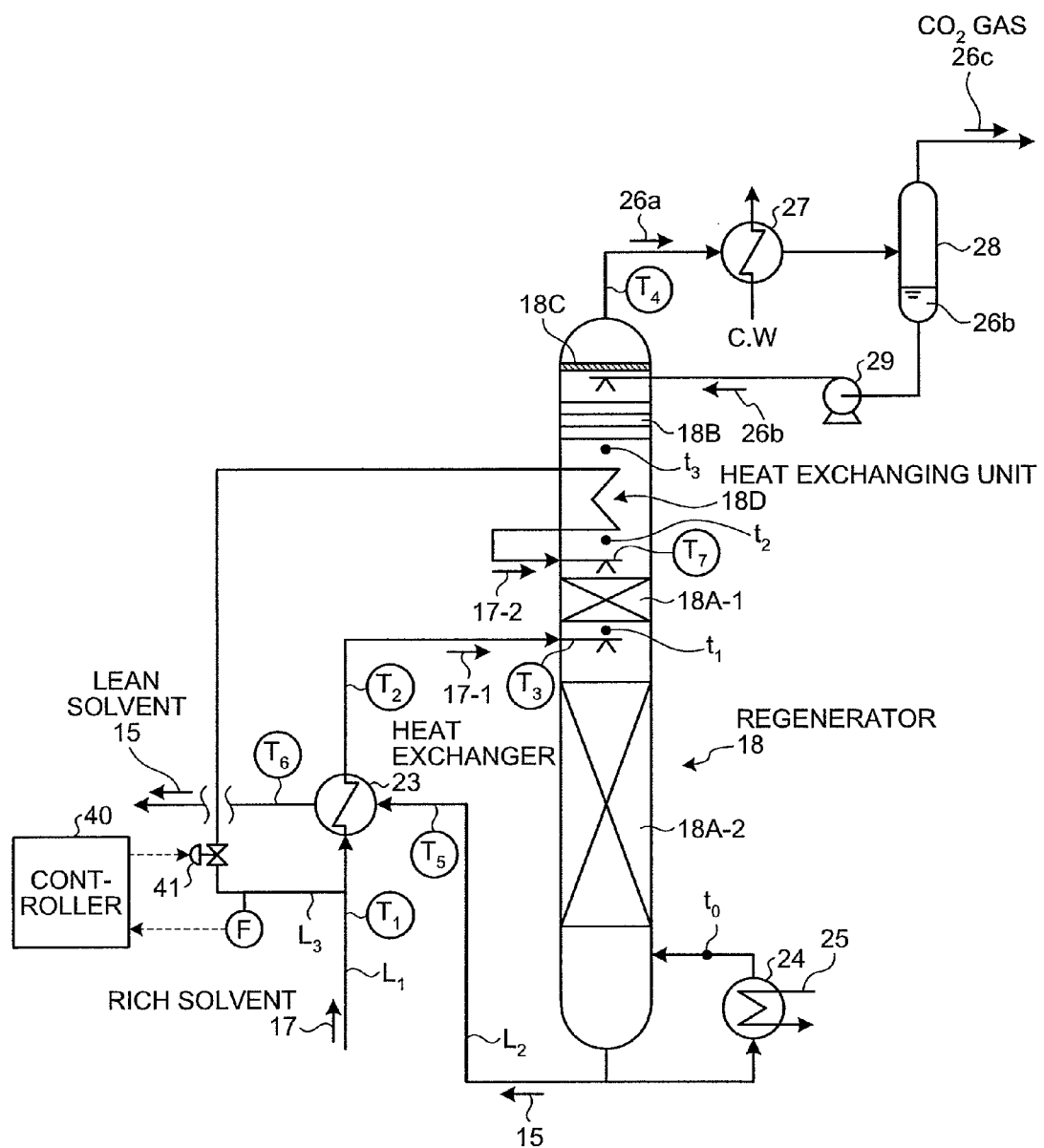
FIG. 3B is another schematic of the structure of the $CO_2$ recovery unit according to the second embodiment.

FIGS. 3A and 3B are schematics of structures of the $CO_2$ recovery unit according to the second embodiment. In these drawings, the same structures as those in the $CO_2$ recovery unit shown in FIG. 1 are given the same references signs, and redundant explanations thereof are omitted herein.

As shown in FIG. 3A, the $CO_2$ recovery unit according to the second embodiment includes a first heat exchanging unit 18D that allows the rich solvent portion 17-2 bypassed and introduced from the top of the regenerator 18 to exchange heat at the top of the regenerator.

In the first heat exchanging unit 18D, the rich solvent portion 17-2 that is temporarily is brought into the regenerator 18 is heated by way of rising steam, having the temperature thereof ($T_7$) increased by the time of being released into the regenerator 18.

Therefore, the amount of steam used in the regenerating heater 24 can be further reduced, in comparison with the first embodiment, further to improve the heat efficiency of the entire system.

Figure 4A:
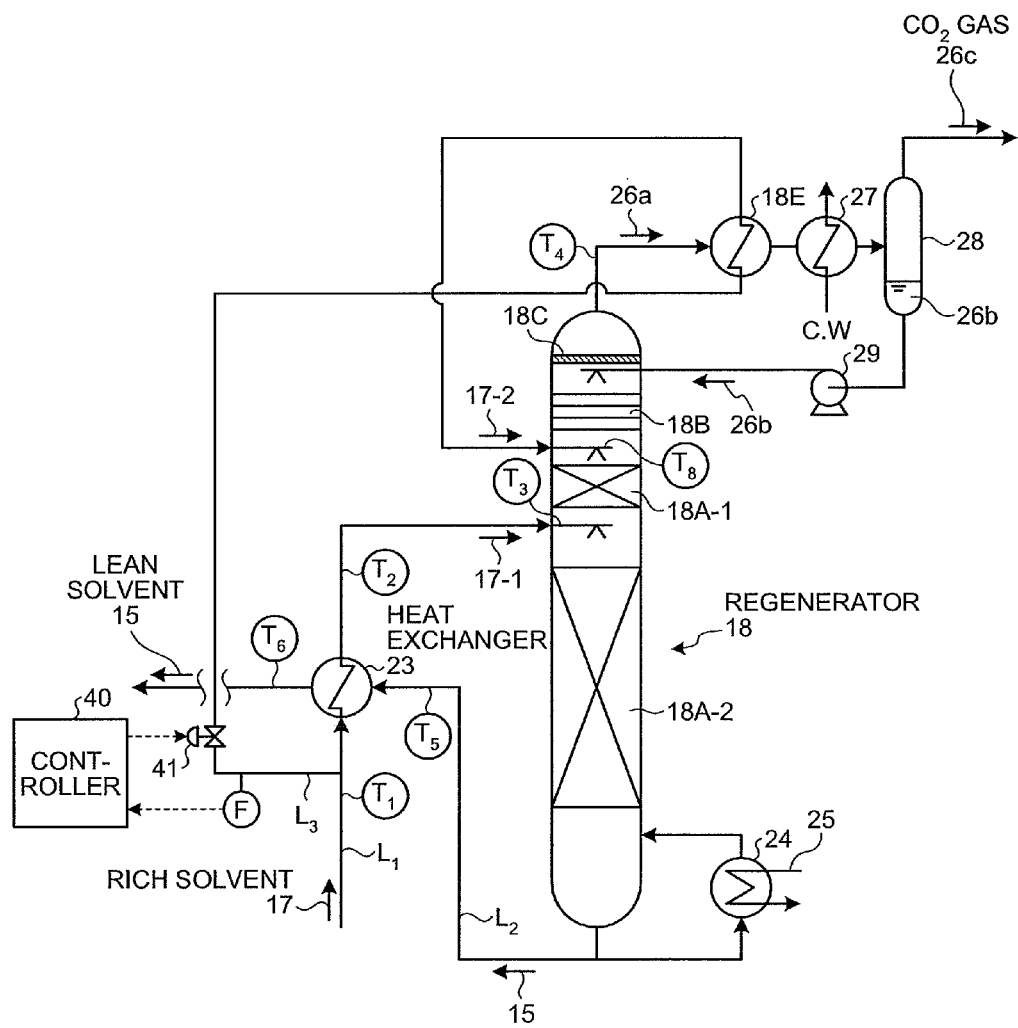
FIG. 4A is a schematic of a structure of a $CO_2$ recovery unit according to a third embodiment of the present invention.
Figure 4B:
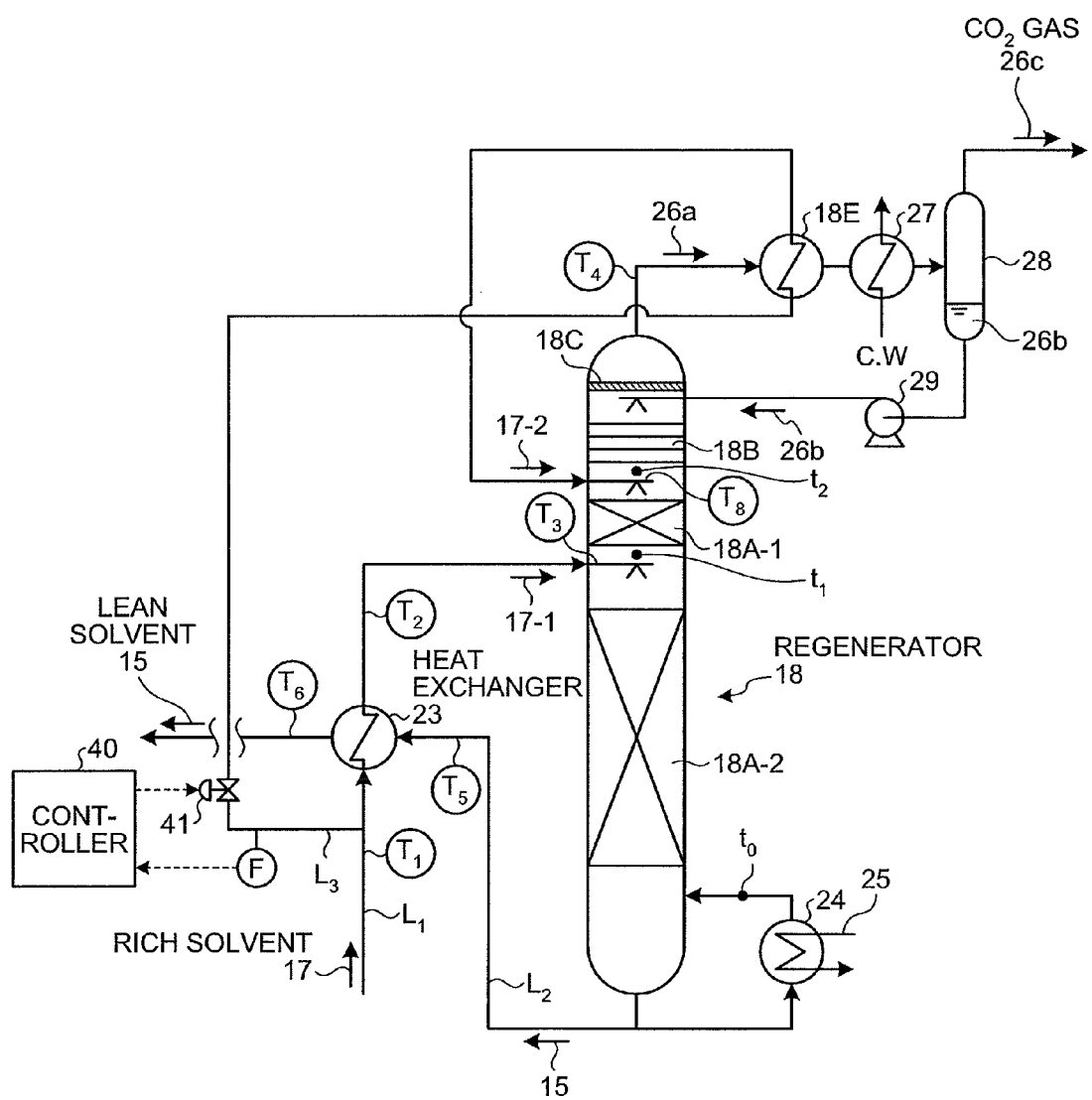
FIG. 4B is another schematic of the structure of the $CO_2$ recovery unit according to the third embodiment.

More Specifically, as shown in the temperature distribution in FIG. 4B, the steam was supplied into the bottom of the regenerator 18 at the temperature of 140 degrees Celsius ($t_0$); after the major rich solvent portion 17-1 was stripped by way of rising steam to release $CO_2$ gas in the second regenerating unit 18A-2, the temperature of the steam was 86 degrees Celsius ($t_1$); and the temperature of the steam after passing through the first regenerating unit 18A-1 was 82 degrees Celsius ($t_3$). The rich solvent portion 17-2 was then temporarily brought into the regenerator 18 at the temperature of 52 degrees Celsius ($T_1$). After the heat exchange, the temperature of the rich solvent increased to 62 degrees Celsius ($T_7$).

As a result, it has been demonstrated that, when the amount of used steam was 120 kg/H, a reduction by 13.4 kg/H was achieved, accounting for 12 percent of a steam reduction. At this time, the loan solvent was let out from the regenerator 18 at the temperature of 109.4 degrees Celsius ($T_5$); after exchanging heat in the heat exchanger 23, the temperature of the rich solvent was 99.3 degrees Celsius ($T_2$); and 10 percent of the rich solvent portion 17-2 was split.

Example 3

A $CO_2$ recovery unit according to a third embodiment of the present invention will now be explained with reference to FIGS. 4A and 4B.

FIGS. 4A and 4B are schematics of structures of the $CO_2$ recovery unit according to the third embodiment. In these drawings, the same structures as those in the $CO_2$ recovery unit shown in FIG. 1 are given the same references signs, and redundant explanations thereof are omitted herein.

As shown in FIG. 4A, the $CO_2$ recovery unit according to the third embodiment includes a second heat exchanging unit 18E that allows the $CO_2$ gas 26a accompanying steam, taken out from the regenerator 18, to exchange heat with the bypassed rich solvent portion 17-2.

Because the rich solvent portion 17-2 that is before being supplied into the regenerator 18 exchanges heat with the $CO_2$ gas 26a accompanying steam that is to be released out, the rich solvent portion 17-2 is heated by steam, having the temperature thereof ($T_8$) increased, by the time the rich solvent portion 17-2 is released into the regenerator 18.

Therefore, the amount of steam used in the regenerating heater 24 can be further reduced, in comparison with the first embodiment, improving the heat efficiency of the entire system further.

More specifically, as shown in the temperature distribution in the FIG. 2B, the steam was supplied into the bottom of the regenerator 18 at the temperature of 140 degrees Celsius ($t_0$); after the major rich solvent portion 17-1 was stripped by way of rising steam to release $CO_2$ gas in the second regenerating unit 18A-2, the temperature of the steam was 86 degrees Celsius ($t_1$); and the temperature of the steam after passing through the first regenerating unit 18A-1 was 82 degrees Celsius ($t_3$). The steam was released out of the regenerator 18 at the temperature of 80 degrees Celsius ($T_4$). The temperature of the rich solvent portion 17-2 was 52 degrees Celsius ($T_1$). After the heat exchange performed in the second heat exchanging unit 18E, the temperature increased to 62 degrees Celsius ($T_8$).

As a result, it has been demonstrated that, when the amount of used steam was 120 kg/H, a reduction by 13.4 kg/H was achieved, accounting for 12 percent of a steam reduction. At this time, the lean solvent was let out from the regenerator 18 at the temperature of 109.4 degrees Celsius ($T_5$); after exchanging heat in the heat exchanger 23, the temperature of the rich solvent was 99.3 degrees Celsius ($T_2$); and 10 percent of the rich solvent portion 17-2 was split.

The invention claimed is:

1. A $CO_2$ recovery unit, which includes a $CO_2$ absorber that brings flue gas containing $CO_2$ into contact with a $CO_2$ absorbent to reduce the $CO_2$ contained in the flue gas, and a regenerator that reduces $CO_2$ contained in rich solvent absorbing $CO_2$ in the $CO_2$ absorber to regenerate the rich solvent, so that lean solvent from which the $CO_2$ is reduced in the regenerator is reused in the $CO_2$ absorber, comprising:
   a heat exchanger that allows the rich solvent to exchange heat with the lean solvent; and
   a controller that controls to extract part of the rich solvent to allow the part to bypass the heat exchanger, and to be supplied into an upper section of the regenerator without exchanging heat so as to minimize a sum of an enthalpy that is taken out of the regenerator as $CO_2$ gas accompanying steam and an enthalpy that is a result of subtracting an enthalpy of the rich solvent before heat exchange in the heat exchanger from an enthalpy of the lean solvent after the heat exchange,
   wherein the controller includes:
      a plurality of sensors for detecting at least temperatures provided on a rich solvent supplying line and a lean solvent supplying line respectively;
      a flow meter provided on a split rich solvent supplying line; and
      an adjusting valve provided on the split rich solvent supplying line downstream of the flow meter to thereby adjust the amount of the rich solvent to be split under an instruction of the controller by adjusting the adjusting valve based on the information obtained by the plurality of sensors and the flow meter so as to approximate a temperature difference between the rich solvent and the lean solvent at an entering side of the heat exchanger and a temperature difference between the rich solvent and the lean solvent at an exiting side of the heat exchanger.

2. The $CO_2$ recovery unit according to claim 1, wherein the controller controls so that the part of the rich solvent that has bypassed the heat exchanger accounts for 3 to 15 percent by weight of the rich solvent.

3. The $CO_2$ recovery unit according to claim 1, first heat exchanging unit that allows the part of the rich solvent that has bypassed the heat the regenerator
   wherein the split rich solvent supplying line is guided into an upper section of the regenerator and constitutes a first heat exchanging unit by which a rich solvent portion exchanges heat in an upper section of the regenerator, and
   wherein the split rich solvent supplying line is once out of the generator and again guided into the upper section of the regenerator to release the rich solvent portion into the regenerator.

4. The $CO_2$ recovery unit according to claim 1 further comprising a second heat exchanging unit that allows the part of the rich solvent that has bypassed the heat exchanger to exchange heat with the $CO_2$ gas accompanying steam extracted from the regenerator.

* * * * *